(12) United States Patent
Lee et al.

(10) Patent No.: US 8,845,105 B2
(45) Date of Patent: Sep. 30, 2014

(54) IMAGE PROJECTOR HAVING TWO OPPOSING LINEARLY POLARIZED OPTICAL SYSTEMS

(75) Inventors: Yun Mi Lee, Seoul (KR); Sang Ok Yeo, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 639 days.

(21) Appl. No.: 12/836,358

(22) Filed: Jul. 14, 2010

(65) Prior Publication Data

US 2011/0019153 A1  Jan. 27, 2011

(30) Foreign Application Priority Data

Jul. 22, 2009  (KR) ........................ 10-2009-0066987

(51) Int. Cl.
| | |
|---|---|
| *G03B 21/00* | (2006.01) |
| *H04N 13/04* | (2006.01) |
| *H04N 9/31* | (2006.01) |
| *G02B 27/26* | (2006.01) |
| *G03B 21/14* | (2006.01) |

(52) U.S. Cl.
CPC ............ *G02B 27/26* (2013.01); *H04N 13/0422* (2013.01); *H04N 13/0459* (2013.01); *H04N 9/3164* (2013.01); *H04N 9/3105* (2013.01); *G03B 21/14* (2013.01); *H04N 9/3197* (2013.01); *H04N 13/0434* (2013.01)
USPC ............................................. 353/7

(58) Field of Classification Search
CPC ............ H04N 9/3167; H04N 13/0434; H04N 13/0059; H04N 13/0051; G03B 33/12
USPC ............. 353/7–10, 20, 82; 359/464–477, 462
See application file for complete search history.

(56) References Cited

U.S. PATENT DOCUMENTS

| | | | |
|---|---|---|---|
| 2002/0191235 A1* | 12/2002 | O'Connor et al. | ................. 359/9 |
| 2003/0020809 A1* | 1/2003 | Gibbon et al. | .................. 348/51 |
| 2003/0067586 A1* | 4/2003 | Chigira et al. | .................. 353/20 |
| 2007/0132953 A1* | 6/2007 | Silverstein | ........................ 353/7 |
| 2009/0147031 A1* | 6/2009 | Miyazawa | .................... 345/690 |

FOREIGN PATENT DOCUMENTS

JP          10304284 A   * 11/1998

* cited by examiner

*Primary Examiner* — Thanh Luu
*Assistant Examiner* — Danell L Owens
(74) *Attorney, Agent, or Firm* — Birch, Stewart, Kolasch & Birch, LLP

(57) ABSTRACT

Image projector can include a first optical system for producing a first image polarized into a first polarized light, a second optical system for producing a second image polarized into a second polarized light, a polarized light splitting device for reflecting one of the first polarized light and the second polarized light and transmitting the other one such that the first image and the second image travel on the same optical path, and a projecting lens for enlarging and projecting the first and second images from the polarized light splitting device.

12 Claims, 7 Drawing Sheets

IMAGE PROJECTOR HAVING TWO OPPOSING LINEARLY POLARIZED OPTICAL SYSTEMS

CROSS REFERENCE TO RELATED APPLICATION

This application claims the benefit of the Patent Korean Application No. 10-2009-0066987, filed on Jul. 22, 2009, which is hereby incorporated by reference as if fully set forth herein.

BACKGROUND OF THE DISCLOSURE

1. Field of the Disclosure

The present invention relates to an image projector for enlarging and projecting an image.

2. Discussion of the Related Art

As an information oriented society is developed rapidly, importance of a display system which produces a large image is emphasized.

As an example of a device for producing such a large image, there is the image projector which has a function for enlarging and projecting the image.

The image projector is a device which produces the image by using a light from a light source, and projects the image produced thus, such as projectors and projection TV set, typically.

Recently, as the image projector is regarded as an interior decorative electronic device for expressing individuality of owner of the device, a variety of design shapes are on demands.

And, in order produce the image closer to reality, a variety of attempts have been applied to the image projector.

As examples, a miniature projector of LED used as the light source, a high color feeling projector of laser used as the light source, and so on are under development.

In addition to above attempts, a system for producing a 3D image by using the image projector closer to reality may be considered.

SUMMARY OF THE DISCLOSURE

Accordingly, the present invention is directed to an image projector.

An object of the present invention is to provide an image projector in which two images are made to travel the same light path for increasing brightness of an image produced.

Another object of the present invention is to provide an image projector which can produce a 2D or 3D image selectively.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an image projector includes a first optical system for producing a first image polarized into a first polarized light, a second optical system for producing a second image polarized into a second polarized light, a polarized light splitting device for reflecting one of the first polarized light and the second polarized light and transmitting the other one such that the first image and the second image travel on the same optical path, and a projecting lens for enlarging and projecting the first and second images from the polarized light splitting device.

The first and second optical systems can be arranged perpendicular to each other, or parallel to each other.

And, preferably, optical distances between the first and second optical systems and the polarized light splitting device are the same.

Next, each of the first optical system and the second optical system can include a light source for emitting a light, a polarizing device for polarizing the light, and a color breakup and mixing unit having a plurality of display devices controlled to produce the first image and the second image by reflecting the light polarized thus.

And, each of the first optical system and the second optical system can further include a polarizing plate mounted to an output direction of the color breakup and mixing unit for converting the polarized light of the display devices identical to one another.

Moreover, the output direction of the color breakup and mixing unit of the second optical system can include a polarized light converting device for converting a polarized direction of the second image.

In this instance, the polarized light converting device can be a half-wave plate which turns a polarized direction of the second image to 90°.

And, the polarized light converting device can be arranged between the display devices of the second optical system and the polarized light splitting device.

The color breakup and mixing unit can include first, second and third color breakup devices arranged to face three display devices respectively for breaking up the colors, and a color mixing device arranged between the first, second and third color breakup devices for mixing colors.

Moreover, the color breakup and mixing unit can include a first color breakup and mixing unit arranged to face two display devices in common for braking up colors, a second color breakup and mixing unit arranged to face one display device for braking up colors, and a color mixing device arranged between the first and second color breakup devices for mixing colors.

In this instance, the first and second optical systems can include a color breakup and mixing unit having two color breakup devices in the same fashion, or a color breakup and mixing unit having three color breakup devices in the same fashion.

Or, the first and second optical systems can be arranged such that the first optical system includes a color breakup and mixing unit having two color breakup devices and the second optical system includes a color breakup and mixing unit having three color breakup devices, or the first optical system includes a color breakup and mixing unit having three color breakup devices and the second optical system includes a color breakup and mixing unit having two color breakup devices.

In another aspect of the present invention, an image projector includes a first optical system for producing a first image polarized into a first polarized light, a second optical system for producing a second image polarized into a second polarized light, a polarized light splitting device for reflecting one of the first polarized light and the second polarized light and transmitting the other one such that the first image and the second image travel on the same optical path, a projecting lens for enlarging and projecting the first and second images, and a controller for controlling the first and second optical systems such that the first and second images produce a left eye or right eye image for producing a 3D image, or the first and second images produce identical image for producing a 2D image.

In another aspect of the present invention, an image projector includes first and second light source units, a first display unit for having a light from the first light source unit incident thereon to produce a 3D image or a 2D image according to a first or second mode control signal, a second display unit for having a light from the second light source unit incident thereon to produce the 3D image or the 2D image according to the first or second mode control signal, a polarized light splitting device for making the 3D or 2D image from the first and second display units to travel on the same optical path and splitting a polarized light of the 3D or 2D image, a projecting lens for enlarging and projecting the 3D or 2D image, and a controller for generating the first or second mode control signal in response to a control signal applied from an outside of the image projector and controlling the first and second display units.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
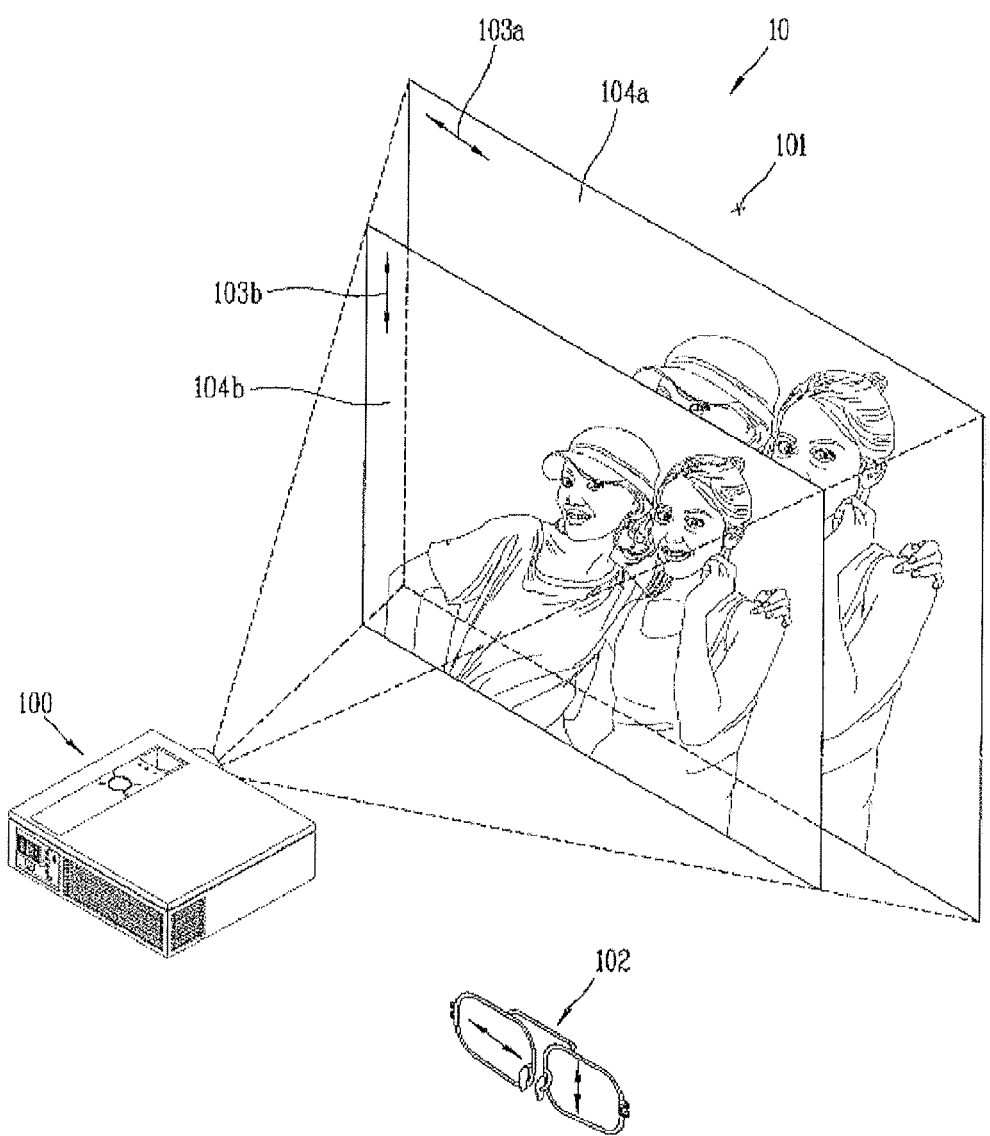
FIG. 1 illustrates a perspective view of a 3D image display system in accordance with a preferred embodiment of the present invention.

FIG. 1 illustrates a perspective view of a 3D image display system 10 in accordance with a preferred embodiment of the present invention.

Referring to FIG. 1, the 3D image display system 10 includes an image projector 100 arranged to produce a 3D image, a screen unit 101, and a polarizing goggles 102.

The image projector 100 which is a device for producing an image by using a light from a light source and projecting the image produced thus may be a projector for enlarging and projecting the image as shown.

The image projector 100 of the present invention will be described, taking the projector as an example.

However, the image projector 100 is not limited to this, but is applicable even to, for an example, a projector built-in a projection TV.

The image projector 100 is formed to project first and second images 104a and 104b respectively having polarized directions 103a and 103b different from each other, together.

The first and second images 104a and 104b can be formed to have a binocular parallax which forms a 3D image.

That is, the first and second images 104a and 104b can be left and right eye images, respectively.

The screen unit 101 shows the image enlarged and projected thus on a screen.

The screen unit 101 is arranged at a position perpendicular to a direction of projection of the image projector 100 such that the first and second images 104a and 104b are projected thereon.

The screen unit 101 may be, for an example, a wall surface, or a film of achromatic color or a silver color.

The screen unit 101 may be a polarization maintaining screen formed to maintain a polarized state.

The polarizing goggles 102 are fabricated of polarizing plates matched to the polarized directions 103a and 103b which are different for a left eye and a right eye, through which the first and second images 104a and 104b which have the binocular parallax reach to the left eye and the right eye of the user respectively, enabling the user to see the 3D image.

An image projector which can produce the 3D image will be described, taking an example.

Figure 2A:
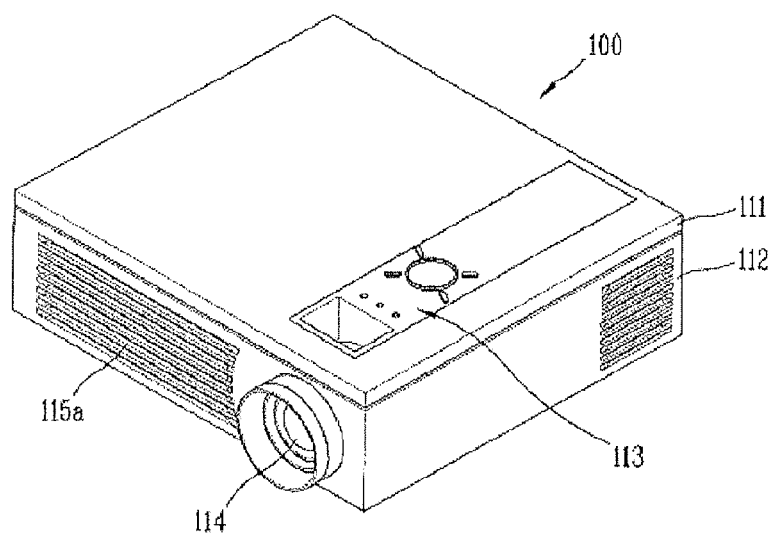
FIGS. 2A and 2B illustrate front side and back side perspective views of the image projector in FIG. 1, respectively.
Figure 2B:
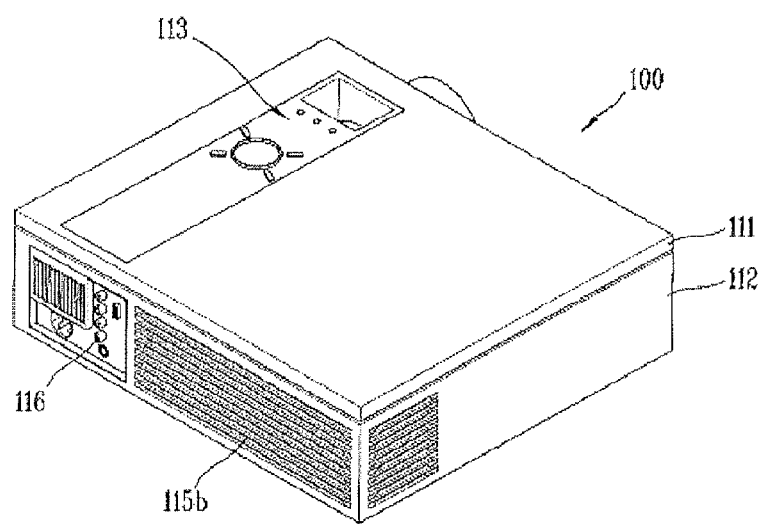

FIGS. 2A and 2B illustrate front side and back side perspective views of the image projector 100 in FIG. 1, respectively.

Referring to FIGS. 2A and 2B, the image projector 100 has a case with an upper case and a lower case 111 and 112 which forms an exterior of a body thereof.

There are various optical components and electronic components mounted in a space formed by the upper and lower cases 111 and 112.

The upper case 111 may have an operating unit 113 arranged thereon.

The operating unit 113 enables the user to input control instructions, such as starting, finishing, Zoom-In, Zoom-Out, focusing, and so on, and can be any system as far as the system can be operated in a tactile manner which allows the user to operate the image projector 100 while having a sense of touch.

For an example, the operating unit 113 may include an operating key for the user to make the image projector 100 to select and project one of the 2D and 3D images.

To do this, the image projector 100 may be configured to project only one image or the left eye image and the right eye image together by selection.

The lower case 112 may have a projecting unit 114, first and second air flow portions 115a and 115b, and an interface 116 arranged thereon.

The projecting unit 114 is formed to enlarge the image projected from the image projector 100.

The first and second air flow portions 115a and 115b have a plurality of pass through holes for allowing an air flow into an inside of the image projector 100, for cooling the image projector 100 by forced convection.

The interface 116 is a passage for the image projector 100 to make data exchange or the like with external devices.

The image projector 100 can receive an image data of the image to be projected from the image projector 100 through the interface 116.

Referring to the drawings, the interface 116 includes a connection terminal which can be connected to an electronic device which can supply video or audio data, such as a computer, a DVD player, and so on.

Figure 3:
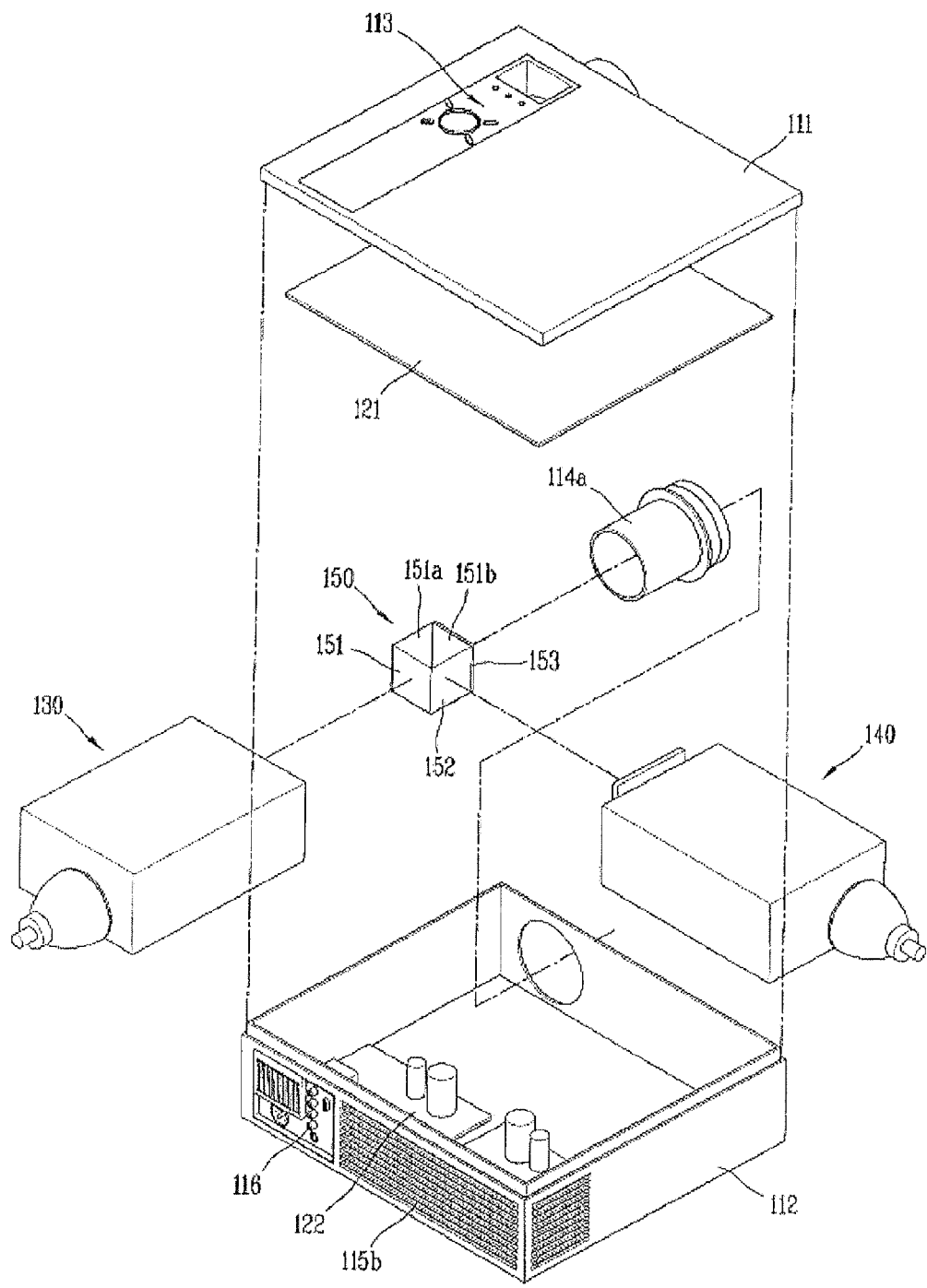
FIG. 3 illustrates an exploded perspective view of the image projector in FIG. 1.
Figure 4:
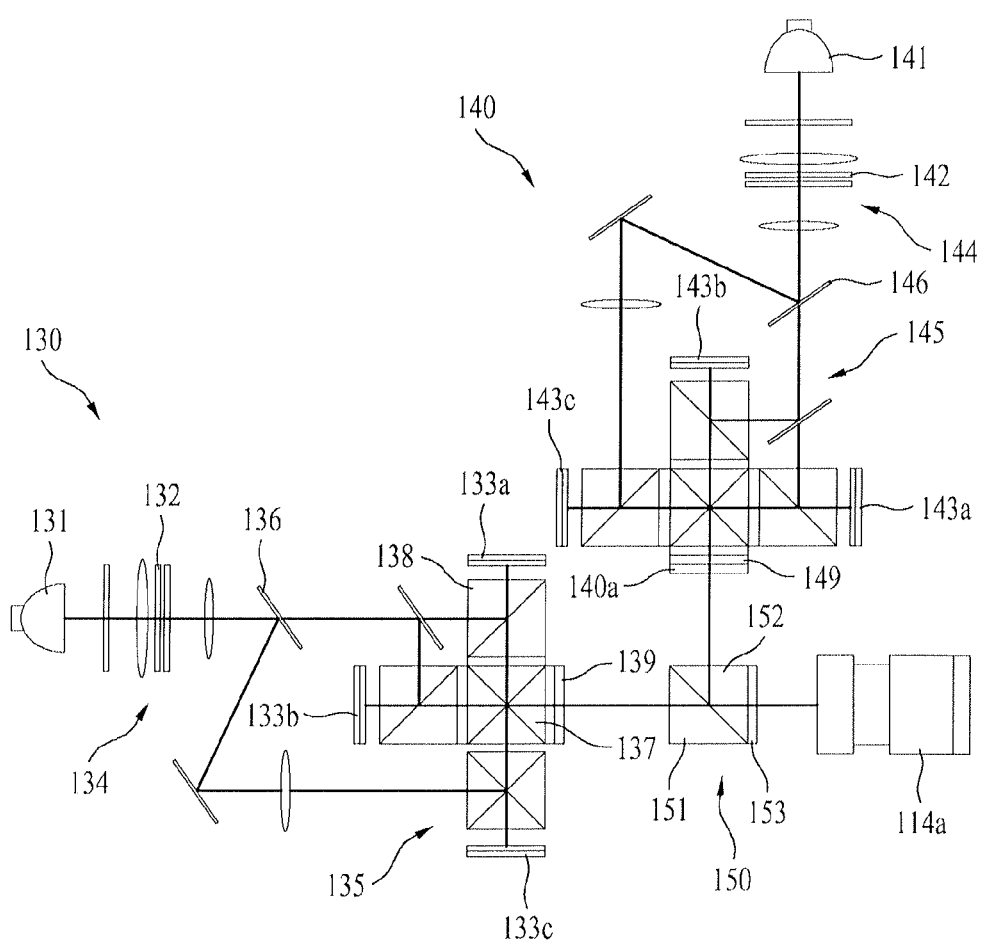
FIG. 4 illustrates a conceptual diagram of travel of a light in the first and second optical systems in FIG. 3.

FIG. 3 illustrates an exploded perspective view of the image projector 100 in FIG. 1, and FIG. 4 illustrates a conceptual diagram of travel of a light in the first and second optical systems in FIG. 3.

The lower case 112 may have a control circuit board 121 and a power source board 122 mounted thereon.

The control circuit board 121 may be configured as an example of a controller for operating various functions of the image projector 100.

The power source board 122 receives AC power or the like and converts the AC power to DC power required for operation of the image projector 100.

The lower case 112 may have first and second optical systems 130 and 140, a polarizing light splitting device 150 and a projecting lens 114a mounted thereto.

Arranged between the first and second optical systems 130 and 140 and the lower case 112, there may be a structure (not shown) for fastening the first and second optical systems 130 and 140 thereto, additionally.

The first optical system 130 is formed to form the first image 104a (See FIG. 1) of a first polarized light.

The first polarized light may be one of linearly polarized lights, such as a P wave.

The second optical system 140 is formed to form the second image 104b of a second polarized light.

The second polarized light may be a polarized light having a polarized direction different from the first polarized light.

The polarizing light splitting device 150 has first and second incident portions 151 and 152 arranged to have the first and second polarizing lights to incident on the first and second incident portions 151 and 152 respectively, to reflect one of the first and second polarizing lights and to transmit the other one thereof such that the first and second polarizing lights travel the same light path.

The polarizing light splitting device has the first and second incident portions 151 and 152 formed perpendicular to each other.

For an example, the polarizing light splitting device 150 has rectangular prisms 151a and 151b arranged to face each other at hypotenuses thereof having a coat of polymer applied thereto such that one of the first and second polarized lights reflects at a hypotenuse surface and the other one transmits therethrough.

The first and second incident portions 151 and 152 are faces of the rectangular prisms 151a and 151b which are not the hypotenuses, respectively.

The first and second optical systems 130 and 140 may be arranged perpendicular to each other such that the first and second polarized lights are incident on the first and second incident portions 151 and 152.

The polarizing light splitting device 150 may be a PBS (Polarizing Beam Splitter) formed to have a hypotenuse which transmits the P wave and reflects the S wave.

In detail, the hypotenuse of the PBS transmits the first polarized light from the first optical system, i.e., the P wave and reflects the second polarized light from the second optical system 140, i.e., the S wave in a direction to be superimposed with the P wave.

Eventually, the first and second images 104a and 104b formed at the plurality of optical systems 130 and 140 are superimposed into one image in a state the first and second images 104a and 104b are polarized into the P wave and the S wave.

The projecting lens 114a is arranged on the same light path for enlarging the first and second images 104a and 104b.

The projecting lens 114a has enlarging and projecting lenses arranged at predetermined intervals to form the projecting unit 114 (See FIG. 2A).

Thus, the image projector 100 can enhance brightness of the image projected to the screen unit 101 by projecting a plurality of images formed at the plurality of optical systems along the same optical path.

The first and second optical systems in accordance with a preferred embodiment of the present invention will be described in detail, with reference to the attached drawings.

FIG. 4 illustrates a conceptual diagram of travel of a light in the first and second optical systems in FIG. 3.

Referring to FIG. 4, the first optical system 130 includes a light source 131, a polarizing device 132, and display devices 133a, 133b, and 133c arranged in succession along the light path to form the first image by using a light from the light source 131.

The light source 131 receives electric energy and converts the electric energy into light energy.

The light source 131 may be, for an example, an ultra-high pressure mercury-vapor lamp (UHV Lamp), or LED.

In order to assist operation of the light source 131, ballast which stabilizes electricity being supplied to the light source 131 and a cooling fan for forming forced convection may be mounted to the lower case 112.

The polarizing device 132 may be an optical device which is a combination of the PBS and an HWP (Half Wave Plate) for polarizing the light into the first or second polarized light.

The polarizing device 132 may be, for an example, a PCS device. In the embodiment, the polarizing device 132 is formed to polarize the light from the light source into the second polarized light, for an example, the S wave.

Arranged between the light source 131 and the display devices 133a, 133b, and 133c, there is an illuminative optical system 134.

The display devices 133a, 133b, and 133c are controlled to form an image by using the polarized light.

The display devices 133a, 133b, and 133c reflect the polarized light incident thereon to form the first image.

In detail, the display devices 133a, 133b, and 133c reflect the polarized light at a plurality of cells so as to be matched to the image to be produced independently.

The display devices 133a, 133b, and 133c can be connected to, and controlled by, the control circuit board 121 electrically.

Referring to the attached drawings, the display devices 133a, 133b, and 133c may be blue, green, and red LCOS (Liquid Crystal on Silicon) display devices which reflect blue, green and red polarized lights to form images of three primary colors, respectively.

However, the present invention is not limited to this, but the display devices 133a, 133b, and 133c may be micro LCD (Liquid Crystal Display) devices or DMDs (Digital Micromirror Devices).

The image projector 100 includes a color breakup and mixing unit 135 for forming images of the three primary colors, respectively.

The color breakup and mixing unit 135 is arranged between the polarizing device 132 and the polarizing light splitting device 150 for breaking up the first or second polarized light into three primary lights, reflecting at the display devices 133a, 133b, and 133c to form images of three primary colors, and superimposing the images of three primary colors into single image.

The color breakup and mixing unit 135 includes a plurality of dichroic mirrors 136 each for reflecting one of three primary colors.

In detail, the plurality of dichroic mirrors 136 are blue, green and red dichroic mirrors 136 for reflecting blue, green and red only respectively and splitting the polarized light into three primary colors.

The color breakup and mixing unit 135 includes an X dichroic prism 137 and PBS devices 138.

The PBS devices 138 are arranged between three faces of the dichroic prism and the display devices 133a, 133b, and 133c, respectively.

The PBS devices 138 reflect the S wave reflected at the dichroic mirrors 136 to the display devices 133a, 133b, and 133c respectively, and transmit the P wave converted at the LCOS display devices toward the X dichroic prisms 137.

The X dichroic prisms 137 reflect blue and red at an X-surface and are arranged between the display devices 133a, 133b, and 133c.

Of faces of the X dichroic prisms 137, a face having no PBS device 138 arranged thereto is an image forwarding portion which may have a polarizing plate 139 mounted thereto for making a polarizing state of the first polarized light more uniform.

That is, since a green polarized light from the green display device 133b has a polarized state different from polarized lights from the blue display device 133a, and the red display device 133c, the polarizing plate 139 converts the green polarized light to have the polarized state identical to the polarized states of the blue and red polarized lights.

Referring to the attached drawings, the second optical system 140 includes a light source 141 for emitting a light, a polarizing device 142 for polarizing the light into a first polarized light or a second polarized light, and display devices 143a, 143b and 143c controlled for reflecting polarized lights incident thereon to form the second image 104b.

The second optical system 140 has a color breakup and mixing unit 145 arranged between the polarizing device 142 and the polarizing light splitting device 150 for breaking up the first or second polarized light into three primary colors, reflecting the first or second polarized light having colors thereof broken up thus at a plurality of display devices 143a, 143b and 143c respectively to form images of three primary colors, and superimposing the images of three colors into a single image.

The second optical system 140 has the light source 141, the polarizing device 142, the display devices 143a, 143b and 143c, and the color breakup and mixing unit 145 arranged in an order identical to the first optical system 130.

The color breakup and mixing unit 145 of the second optical system 140 has a polarized light converting device 140a mounted to a portion thereof from which the image is forwarded.

The polarized light converting device 140a is arranged on an optical path between the display devices 143a, 143b and 143c of the second optical system 140 and the polarizing light splitting device 150 for converting a polarized direction of the second image 104b from the polarized direction of the first polarized light to the polarized direction of the second polarized light.

Referring to the drawings attached hereto, the polarized light converting device 140a is arranged to face a polarizing plate 149 for making a polarized state of the first polarized light uniform.

The polarized light converting device 140a is formed to turn a polarized direction by 90°.

For an example, the polarized light converting device 140a can be a half wave plate.

The polarized light converting device 140a may be formed of, for an example, quartz.

The first and second optical systems 130 and 140 are fabricated according to one optical design, except that the second optical system 140 has the polarized light converting device 140a additionally, enabling simple fabrication of the first and second optical systems 130 and 140.

The display devices 133a, 133b and 133c of the first optical system 130 and the display devices 143a, 143b and 143c of the second optical system 140 can be controlled by a first control mode such that the first and second images 104a and 104b form a left eye image and a right eye image respectively, or by a second control mode such that first and second images 104a and 104b form the same image. The first control mode enables to project the 3D image, and the second control mode enables to project the 2D image, both allowing images brighter than before.

Referring to the drawings attached hereto, of the rectangular prisms 151a and 151b of the polarizing light splitting device 150, the prism 151b from which the image is forwarded may have a polarized light changing device 153 mounted thereto.

The polarized light changing device 153 may be, for an example, a λ/4 plate for changing a linear polarized light into a left-circularly polarized light or a right-circularly polarized light, such that the image projector 100 can project the left eye image and the right eye image polarized into the left-circularly polarized light or the right-circularly polarized light.

Figure 5:
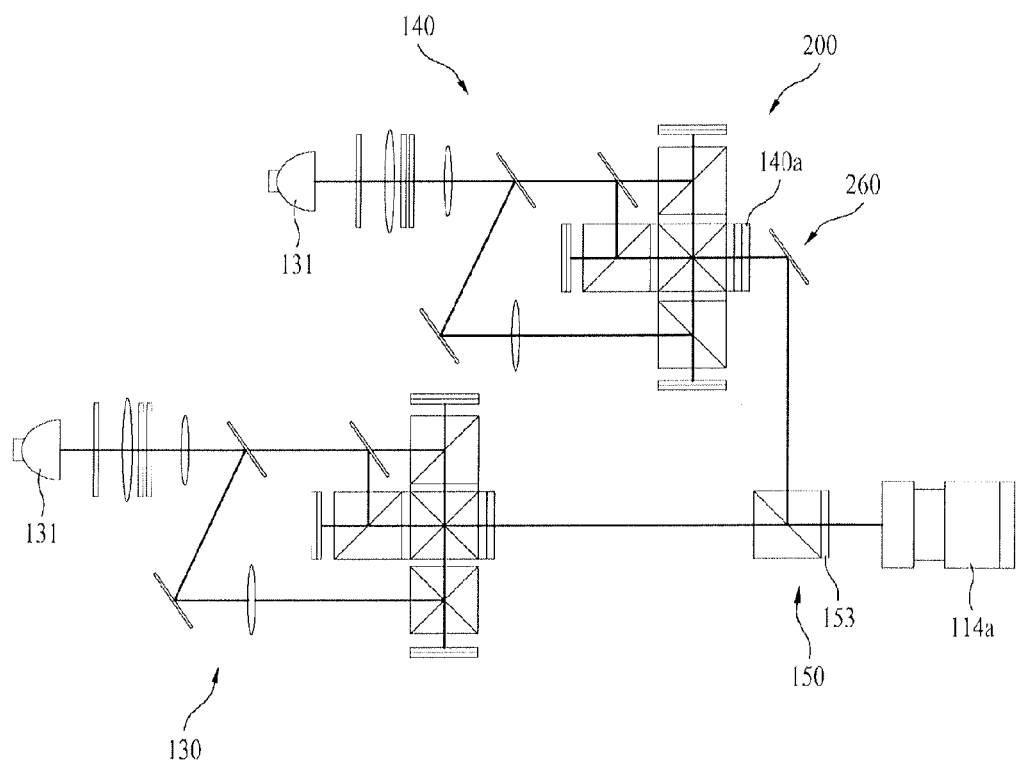
FIG. 5 illustrates a conceptual diagram showing a variation of the optical systems in FIG. 3.

FIG. 5 illustrates a conceptual diagram showing a variation of the optical systems 130 and 140 in FIG. 3.

Referring to the drawings attached hereto, the first and second optical systems 130 and 140 are arranged parallel to each other.

An image projector 200 includes a mirror 260 between one of the first and second optical systems 130 and 140 and the polarizing light splitting device 150 for changing a traveling direction of the first or second polarized light.

Thus, the image projector 200 increases freedom of arrangement of the identical optical systems 130 and 140 by using the mirror 260.

The first optical system 130 is arranged from the polarizing light splitting device 150 farther than the second optical system 140 in the parallel direction.

That is, it is preferable that a distance of a light reaching from the first optical system 130 to the polarizing light splitting device 150 is the same with a distance of a light reaching from the second optical system 140 to the polarizing light splitting device 150, for making light traveling paths from the light sources 131 and 141 to the polarizing light splitting device 150 same at the time the first and second optical systems 130 and 140 are superimposed.

Figure 6A:
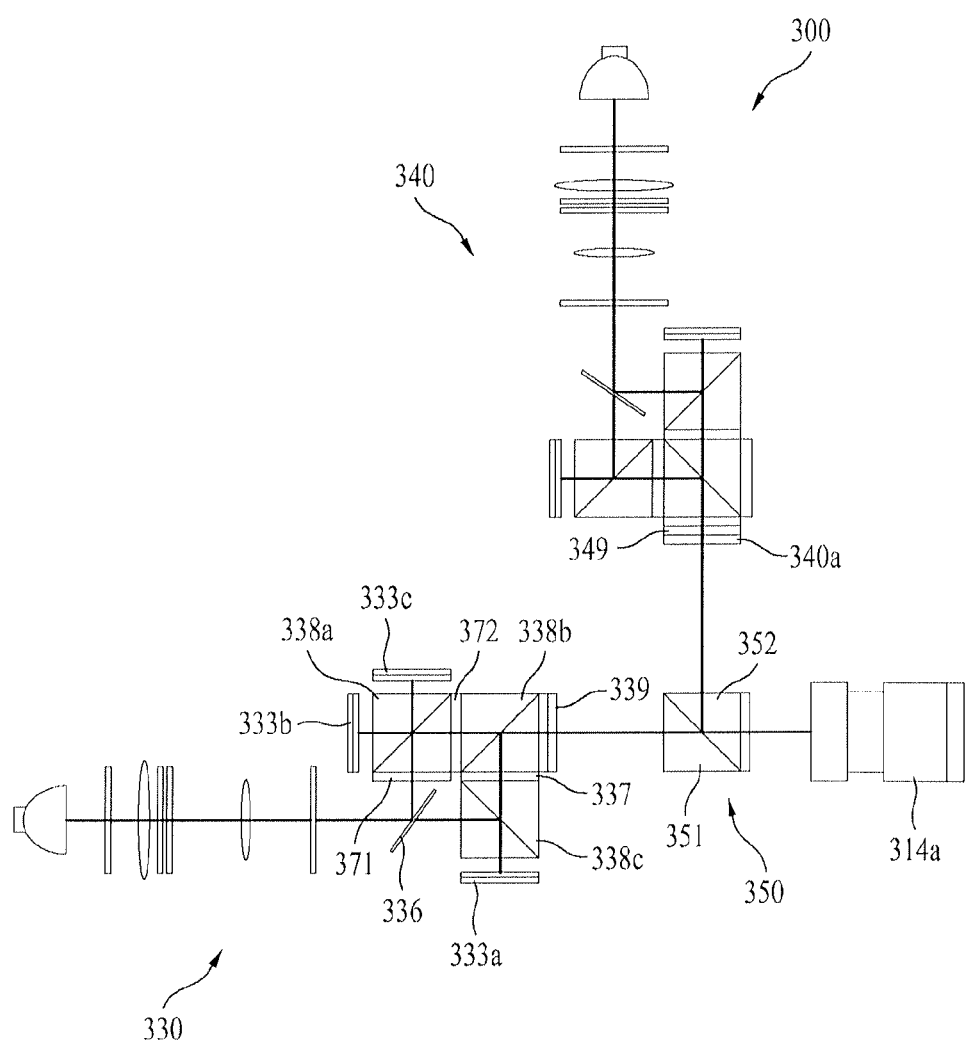
FIGS. 6A and 6B illustrate conceptual diagrams showing image projectors in accordance with other preferred embodiments of the present invention, respectively.
Figure 6B:
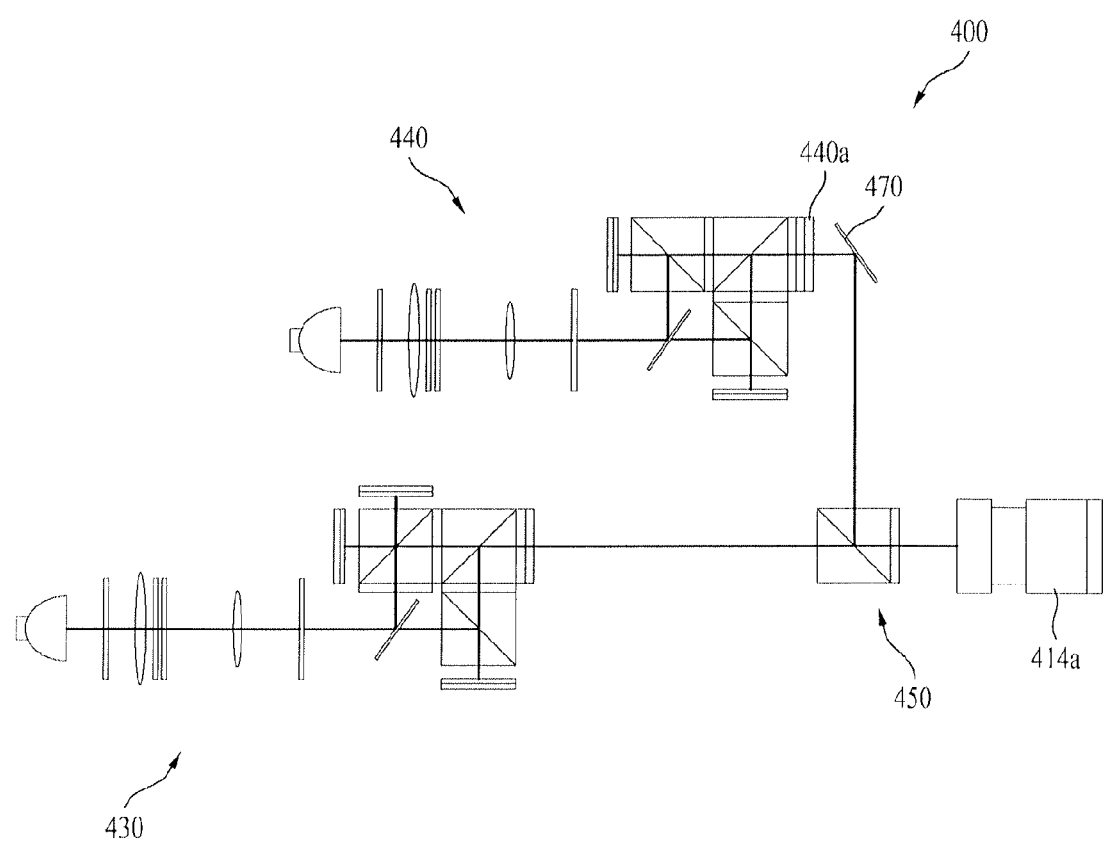

FIGS. 6A and 6B illustrate conceptual diagrams showing image projectors 300 and 400 in accordance with other preferred embodiments of the present invention, respectively.

Referring to FIGS. 6A and 6B, in the first and second optical systems 330 and 340, color breaking up is made by one dichroic mirror 336 and chromatic polarization converting devices 371, 372 and 373.

FIG. 6B illustrates a conceptual diagram showing that a plurality of optical systems 330 and 340 can be arranged parallel to each other by using a mirror 470. The optical system in accordance with a preferred embodiment of the present invention will be described, with reference to a case when the plurality of optical systems 330 and 340 are arranged perpendicular to each other.

Referring to FIG. 6A, the dichroic mirror 336 may be formed to transmit, for an example, blue only.

Each of the chromatic polarization converting devices 371, 372 and 373 is formed to convert a polarized direction of a polarized light of a particular color.

The chromatic polarization converting devices 371, 372 and 373 may include two red polarizing light converting devices 371 and 372 arranged on two faces of a first PBS device 338a respectively and a blue polarizing light converting device 373 arranged on a second PBS device 338b.

Green and red display devices 333b and 333c are arranged to face two faces of the first PBS device 338a respectively, and a blue display device 333a is arranged to face a third PBS device 338c.

The second PBS device 338b has one face having a polarizing plate 339 mounted thereto through which a first image 104a of the first polarized light is forwarded.

The second optical system 340 is identical to the first optical system 330 except that the second optical system 340 has a polarized light converting device 340a mounted to the polarizing plate 349 for converting a polarized direction of the polarized light, through which a second image 104b of the second polarized light is forwarded.

The first and second images are incident on first and second incident portions 351 and 352 of a polarizing light splitting device 350 respectively and travel on the same optical path.

The image projector 300 or 400 enables to make more compact arrangement of the plurality of optical systems 330 and 340 within a space, permitting to provide a smaller image projector 300 or 400.

The image projectors 100, 200, 300 and 400 are not limited to configurations and methods described in respective embodiments, but the embodiments can be combined entirely or partly selectively to make different variations.

In the meantime, referring to FIGS. 4 and 5, the color breakup and mixing unit may include first, second and third color breakup devices arranged to face the three display devices respectively for breaking up colors and color mixing devices arranged between the first, second and third color breakup devices for mixing colors.

Or, referring to FIGS. 6A and 6B, the color breakup and mixing unit may include a first color breakup and mixing device arranged to face both to the two display devices for breaking up colors, a second color breakup and mixing device arranged to face one display device for breaking up colors, and a color mixing device arranged between the first and second color breakup devices for mixing colors.

Accordingly, though each of the first and second optical systems may include the color breakup and mixing unit having the two color breakup devices or the three color breakup devices, as another embodiments, the first optical system may include the color breakup and mixing unit having the two color breakup devices and the second optical system may include the color breakup and mixing unit having the three color breakup devices, or the first optical system may include the color breakup and mixing unit having the three color breakup devices and the second optical system may include the color breakup and mixing unit having the two color breakup devices.

Though not shown, the present invention may include a controller for controlling the first and second optical systems to produce the left eye or right eye image for producing the 3D image, or controlling the first and second optical systems to produce the same image for producing the 2D image, additionally.

That is, the controller may control the first and second optical systems such that the first and second images produce the left eye or right eye image for producing the 3D image, or may control the first and second optical systems such that the first and second images produce the same image for producing the 2D image.

The controller receives a control signal for producing the 3D image or a control signal for producing the 2D image from the user and analyzes the control signal.

Then, the controller generates a first mode control signal if the controller determines that the control signal is a control signal for producing the 3D image, and forwards the first mode control signal to the display devices in the first optical system and the display devices in the second optical system.

Then, for producing the 3D image according to the first mode control signal, the display devices of the first optical system forms the left eye image and the display devices of the second optical system forms the right eye image, or the display devices of the first optical system forms the right eye image and the display devices of the second optical system forms the left eye image.

However, if the controller determines that the control signal is a control signal for producing the 2D image, the controller generates the second mode control signal and forwards the second mode control signal to the display devices of the first optical system and the display devices of the second optical system.

Then, the display devices of the first and second optical systems forms the same image for producing the 2D image according to the second mode control signal.

Thus, the image projector of the present invention can project the left eye image and the right eye image formed at the plurality of optical systems through the same optical path by using the polarizing light splitting device.

The image projector of the present invention can increase brightness of the image projected thus and enables to produce the 3D or 2D image, selectively.

By using the polarizing light converting device mounted to one of the plurality of optical systems, the present invention can make the same optical design applicable to the plurality of optical systems which form the left eye and right eye images, respectively.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image projector comprising:
  a first optical system for producing a first image polarized into a first polarized light, the first optical system including a first color breakup and mixing unit;
  a second optical system for producing a second image polarized into a second polarized light, the second optical system including a second color breakup and mixing unit;
  a polarized light splitting device for reflecting one of the first polarized light and the second polarized light and transmitting the other one such that the first image and the second image travel on the same optical path;
  a projecting lens for enlarging and projecting the first and second images from the polarized light splitting device;

a first polarizing plate disposed between an output portion of the first color breakup and mixing unit and the polarized light splitting device; and a second polarizing plate and a polarized light converting device disposed between an output portion of the second color breakup and mixing unit and the polarized light splitting device, wherein the first color breakup and mixing unit has first and second color breakup devices, wherein the second color breakup and mixing unit has third, fourth and fifth color breakup devices, wherein the first color breakup device includes a first surface facing a first display device and a second surface facing a second display device, wherein the second color breakup device includes a third surface facing a third display device, wherein the third color breakup device includes a fourth surface facing a fourth display device, wherein the fourth color breakup device includes a fifth surface facing a fifth display device, and wherein the fifth color breakup device includes a sixth surface facing a sixth display device.

2. The image projector as claimed in claim 1, wherein the first and second optical systems are arranged perpendicular to each other.

3. The image projector as claimed in claim 1, wherein the first and second optical systems are arranged parallel to each other.

4. The image projector as claimed in claim 3, wherein optical distances between the first and second optical systems and the polarized light splitting device are the same.

5. The image projector as claimed in claim 1, wherein each of the first optical system and the second optical system includes:
 a light source for emitting a light; and
 a polarizing device for polarizing the light.

6. The image projector as claimed in claim 1, wherein the first and second optical systems are controlled to produce a left eye or right eye image for producing a 3D image, or controlled to produce identical image for producing a 2D image.

7. The image projector as claimed in claim 1, wherein the polarized light splitting device includes a first incident portion to have the first polarized light incident thereon and a second incident portion to have the second polarized light incident thereon, and the first incident portion and the second incident portion are formed perpendicular to each other.

8. The image projector as claimed in claim 1, further comprising a mirror arranged between one of the first and second optical systems and the polarized light splitting device for changing a travel direction of the first or second polarized light.

9. An image projector comprising:
 a first optical system for producing a first image polarized into a first polarized light, the first optical system including a first color breakup and mixing unit;
 a second optical system for producing a second image polarized into a second polarized light, the second optical system including a second color breakup and mixing unit;
 a polarized light splitting device for reflecting one of the first polarized light and the second polarized light and transmitting the other one such that the first image and the second image travel on the same optical path;
 a projecting lens for enlarging and projecting the first and second images;

a controller for controlling the first and second optical systems such that the first and second images produce a left eye or right eye image for producing a 3D image, or the first and second images produce identical image for producing a 2D image;
 a first polarizing plate disposed between an output portion of the first color breakup and mixing unit and the polarized light splitting device; and
 a second polarizing plate and a polarized light converting device disposed between an output portion of the second color breakup and mixing unit and the polarized light splitting device,
 wherein the first color breakup and mixing unit has first and second color breakup devices,
 wherein the second color breakup and mixing unit has third, fourth and fifth color breakup devices,
 wherein the first color breakup device includes a first surface facing a first display device and a second surface facing a second display device,
 wherein the second color breakup device includes a third surface facing a third display device,
 wherein the third color breakup device includes a fourth surface facing a fourth display device,
 wherein the fourth color breakup device includes a fifth surface facing a fifth display device, and
 wherein the fifth color breakup device includes a sixth surface facing a sixth display device.

10. The image projector as claimed in claim 9, wherein the first display unit produces a right eye image and the second display unit produces a left eye image, for producing a 3D image according to the first mode control signal, or
 the first display unit produces a left eye image and the second display unit produces a right eye image, for producing a 3D image according to the first mode control signal.

11. An image projector comprising:
 first and second light source units;
 a first display unit for having a light from the first light source unit incident thereon to produce a 3D image or a 2D image according to a first or second mode control signal, the first display unit including a first color breakup and mixing unit;
 a second display unit for having a light from the second light source unit incident thereon to produce the 3D image or the 2D image according to the first or second mode control signal, the second display unit including a second color breakup and mixing unit;
 a polarized light splitting device for making the 3D or 2D image from the first and second display units to travel on the same optical path and splitting a polarized light of the 3D or 2D image;
 a projecting lens for enlarging and projecting the 3D or 2D image;
 a controller for generating the first or second mode control signal in response to a control signal applied from an outside of the image projector and controlling the first and second display units;
 a first polarizing plate disposed between an output portion of the first color breakup and mixing unit and the polarized light splitting device; and
 a second polarizing plate and a polarized light converting device disposed between an output portion of the second color breakup and mixing unit and the polarized light splitting device,
 wherein the first color breakup and mixing unit has first and second color breakup devices, wherein the second color breakup and mixing unit has third, fourth and fifth color breakup devices, wherein the first color breakup device includes a first surface facing a first display device and a second surface facing a second display device, wherein the second color breakup device includes a third surface facing a third display device, wherein the third color breakup device includes a fourth surface facing a fourth display device, wherein the fourth color breakup device includes a fifth surface facing a fifth display device, and wherein the fifth color breakup device includes a sixth surface facing a sixth display device.

12. The image projector as claimed in claim 11, wherein the first and second display units produce 2D images identical to each other according to the second mode control signal.

\* \* \* \* \*